B. F. CULVER.
Molasses Pitcher.
No. 224,080.  Patented Feb. 3, 1880.
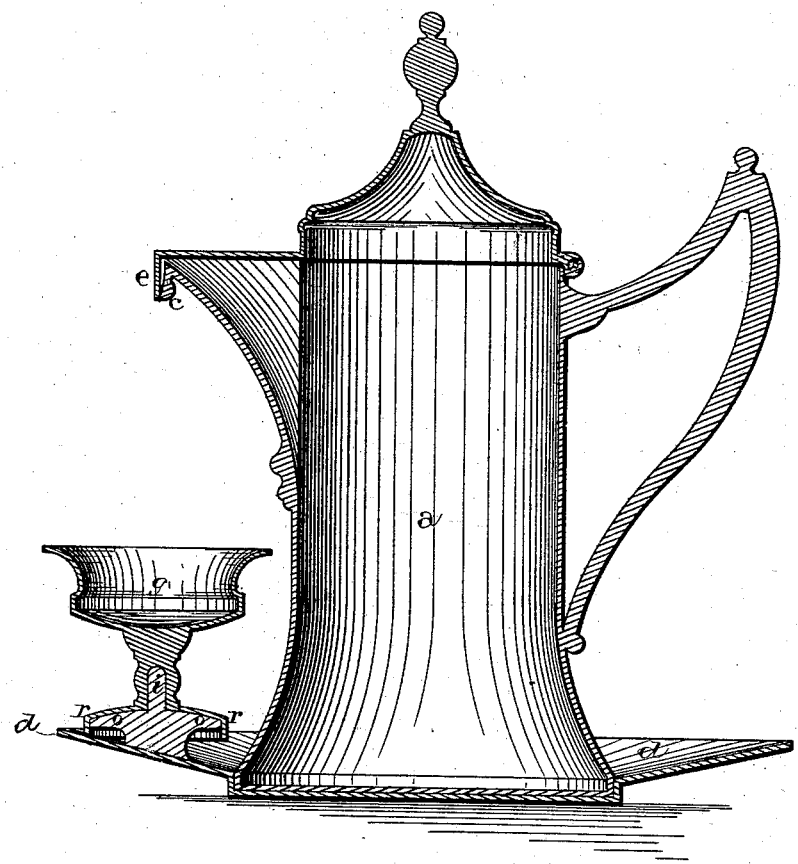
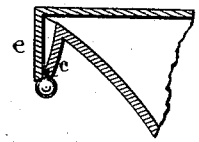
Witnesses:
J. W. Garner
W. W. Mortimer
Inventor:
B. F. Culver
per
F. A. Lehmann,
Atty

UNITED STATES PATENT OFFICE.

BENJAMIN F. CULVER, OF DERBY, CONNECTICUT.

MOLASSES-PITCHER.

SPECIFICATION forming part of Letters Patent No. 224,080, dated February 3, 1880.

Application filed December 26, 1879.

*To all whom it may concern:*

Be it known that I, BENJAMIN FRANKLIN CULVER, of Derby, in the county of New Haven and State of Connecticut, have invented certain new and useful Improvements in Molasses-Pitchers; and I do hereby declare the following to be a full, clear, and exact description of the invention, such as will enable others skilled in the art to which it pertains to make and use it, reference being had to the accompanying drawings, which form part of this specification.

My invention relates to an improvement in molasses-pitchers; and it consists in forming the outer or tip end of the spout in such a manner that it will be impossible for the drippings to run down the side of the pitcher.

It further consists in forming a plate for the pitcher to set on, and which is provided with a drip-cup, into which all of the drippings fall directly from the spout, as will be more fully described hereinafter.

The accompanying drawings represent a vertical section of my invention and a slight modification thereof.

$a$ represents a molasses-pitcher, of any desired shape, size, or material, and which has the tip end $c$ of its spout turned abruptly downward, so that the drippings will be compelled to settle down on and drop from this tip, instead of running down the side of the pitcher. The outer side of this tip is made slightly concave, and the point $e$ of the cover is turned downward so as to fit tightly over the tip, and thus cut off whatever molasses may have adhered to the end of the spout. This pitcher is placed on the plate $d$, which plate may either have a drip-cup, $g$, placed upon it, formed with it or of it, or secured to it, so as to catch the drippings from the spout. As here shown, the plate has a pin or stud, $i$, projecting up from it, and upon which the drip-cup is placed.

In order to hold the cup steady and prevent it from being easily moved, there is a disk or plate, $o$, secured around the stud, which just fits inside of the bottom $r$ of the cup. Thus held the cup is easily removable for the purpose of being cleaned, and yet is in no danger of being displaced while the pitcher is being handed about.

This cup, being placed upon the plate under the spout, catches all drip, and thus neither the pitcher nor the plate ever becomes smeared and dirty with molasses.

In Figure 2 is shown a small ball as attached to the lower end of the tip, which ball serves to collect the drip entirely upon it, so that it will drop from that point only.

Having thus described my invention, I claim—

1. The combination of a molasses-pitcher having the turned-down tip $c$ with a holding-plate that is provided with a drip-cup, substantially as specified.

2. The holding-plate $d$, having the stud $i$ and disk $o$, in combination with the drip-cup, as set forth.

In testimony that I claim the foregoing I have hereunto set my hand this 19th day of December, 1879.

BENJAMIN F. CULVER.

Witnesses:
HENRY E. HOTCHKISS,
WM. S. BROWNE.